(12) United States Patent
Mori (10) Patent No.: US 11,766,789 B2
(45) Date of Patent: Sep. 26, 2023

(54) SHOOTING SYSTEM, SHOOTING METHOD THEREFOR, AND PROGRAM

(71) Applicant: TOYOTA JIDOSHA KABUSHIKI KAISHA, Toyota (JP)

(72) Inventor: Takemitsu Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 17/554,225

(22) Filed: Dec. 17, 2021

(65) Prior Publication Data
US 2022/0193935 A1 Jun. 23, 2022

(30) Foreign Application Priority Data
Dec. 22, 2020 (JP) ................ 2020-212177

(51) Int. Cl.
*B25J 9/16* (2006.01)
*B25J 19/02* (2006.01)
*B25J 19/04* (2006.01)

(52) U.S. Cl.
CPC ........... *B25J 19/023* (2013.01); *B25J 9/1697* (2013.01); *B25J 19/04* (2013.01)

(58) Field of Classification Search
CPC ........ B25J 19/023; B25J 9/1697; B25J 19/04; B25J 9/1689; B25J 11/008
See application file for complete search history.

(56) References Cited

U.S. PATENT DOCUMENTS

| | | | |
|---|---|---|---|
| 2013/0050518 A1* | 2/2013 | Takemura | H04N 21/482 348/E5.042 |
| 2019/0047152 A1* | 2/2019 | Tonogai | B25J 9/1697 |
| 2020/0084423 A1* | 3/2020 | Yamamoto | H04N 23/695 |
| 2021/0178598 A1* | 6/2021 | Yamamoto | B25J 9/1689 |

FOREIGN PATENT DOCUMENTS

JP 6352217 B2 7/2018

\* cited by examiner

*Primary Examiner* — Robert T Nguyen
(74) *Attorney, Agent, or Firm* — Dinsmore & Shohl LLP (57) ABSTRACT

To be able to favorably shoot an object-to-be-shot displayed on a display unit of a remote control-type robot. A shooting system includes a remote control-type robot including a display unit for displaying an image of an object-to-be-shot and that is operated remotely, first image capturing device for shooting the remote control-type robot, and image control device for performing at least one of: replacing the image of the object-to-be-shot displayed on the display unit shot by the first image capturing device; adjusting the image of the object-to-be shot displayed on the display unit; changing the position of the display unit; and changing the posture of the display unit so that the image of the object-to-be-shot displayed on the display unit is made clearer when the display unit of the remote control-type robot falls within a shooting range of the first image capturing device.

8 Claims, 8 Drawing Sheets

SHOOTING SYSTEM, SHOOTING METHOD THEREFOR, AND PROGRAM

CROSS REFERENCE TO RELATED APPLICATIONS

This application is based upon and claims the benefit of priority from Japanese patent application No. 2020-212177, filed on Dec. 22, 2020, the disclosure of which is incorporated herein in its entirety by reference.

BACKGROUND

The present disclosure relates to a shooting system for a remote control-type robot, a shooting method therefor, and a program.

A shooting system including a remote control-type robot that includes a display unit for displaying an object-to-be-shot and that is operated remotely and image capturing means for shooting the remote control-type robot has been known (e.g. Japanese Patent No. 6352217).

SUMMARY

In the aforementioned shooting system, when image quality of an image displayed on the display unit of the remote control-type robot is poor such as being too dark or too bright, it is difficult to shoot the object-to-be-shot that is displayed on the display unit using the image capturing device.

The present disclosure has been made in view of the problem mentioned above and an object of the present disclosure is to provide a shooting system adapted to favorably shoot an object-to-be-shot displayed on a display unit of a remote control-type robot, a shooting method therefor, and a program.

An aspect of the present disclosure for achieving the aforementioned object is a shooting method for a shooting system that includes:
 a remote control-type robot including a display unit for displaying an image of an object-to-be-shot and that is operated remotely; and
 first image capturing device for shooting the remote control-type robot,
 the method including performing at least one of
  replacing the image of the object-to-be-shot displayed on the display unit shot by the first image capturing device;
  adjusting the image of the object-to-be shot displayed on the display unit;
  changing the position of the display unit; and
  changing the posture of the display unit
 when the display unit of the remote control-type robot falls within a shooting range of the first image capturing device so that the image of the object-to-be-shot displayed on the display unit is made clearer.

In the aforementioned aspect, image quality of the image of the object-to-be-shot may be determined based on the image of the object-to-be-shot displayed on the display unit shot by the first image capturing device, and
 at least one of:
  replacing the image of the object-to-be-shot displayed on the display unit shot by the first image capturing device;
  adjusting the image of the object-to-be-shot displayed on the display unit;
  changing the position of the display unit; and
  changing the posture of the display unit
 may be performed when it is determined that the image quality of the image of the object-to-be-shot is poor.

In the aforementioned aspect, when it is determined that the image quality of the image of the object-to-be-shot is poor, the image of the object-to-be-shot displayed on the display unit shot by the first image capturing device may be replaced by another image of the object-to-be-shot stored in the storage unit in advance.

In the aforementioned aspect, when it is determined that the image quality of the image of the object-to-be-shot is poor, the image of the object-to-be-shot displayed on the display unit shot by the first image capturing device may be replaced by another image of the object-to-be-shot shot by second image capturing device.

In the aforementioned aspect, the image quality of the image of the object-to-be-shot may be determined along with the state of the image of the object-to-be-shot based on the image of the object-to-be-shot displayed on the display unit shot by the first image capturing device, and when it is determined that the image quality of the image of the object-to-be-shot is poor such that the luminance of the image of the object-to-be-shot is equal to or lower than a first prescribed value and the image is dark, the luminance of the display unit is controlled so that the luminance of the image of the object-to-be-shot is made larger than the first prescribed value, and when it is determined that the image quality of the image of the object-to-be-shot is poor such that the luminance of the image of the object-to-be-shot is higher than a second prescribed value and the image is bright, the luminance of the display unit is controlled so that the luminance of the image of the object-to-be-shot is made smaller than the second prescribed value.

Another aspect of the present disclosure for achieving the aforementioned object may be a shooting system including:
 a remote control-type robot including a display unit for displaying an image of an object-to-be-shot and that is operated remotely;
 first image capturing device for shooting the remote control-type robot; and
 image control device for performing at least one of:
  replacing the image of the object-to-be-shot displayed on the display unit shot by the first image capturing device;
  adjusting the image of the object-to-be shot displayed on the display unit;
  changing the position of the display unit; and
  changing the posture of the display unit
 when the display unit of the remote control-type robot falls within a shooting range of the first image capturing device so that the image of the object-to-be-shot displayed on the display unit is made clearer.

Further another aspect of the present disclosure for achieving the aforementioned object may be a non-transitory computer readable medium storing a program for a shooting system that includes:
 a remote control-type robot including a display unit for displaying an image of an object-to-be-shot and that is operated remotely; and
 first image capturing device for shooting the remote control-type robot,
 the program causing a computer to perform at least one of:
  replacing the image of the object-to-be-shot displayed on the display unit shot by the first image capturing device;
  adjusting the image of the object-to-be shot displayed on the display unit;

changing the position of the display unit; and
changing the posture of the display unit
when the display unit of the remote control-type robot falls within a shooting range of the first image capturing device so that the image of the object-to-be-shot displayed on the display unit is made clearer.

According to the present disclosure, a shooting system adapted to favorably shoot an object-to-be-shot displayed on a display unit of a remote control-type robot, a shooting method therefor, and a program can be provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
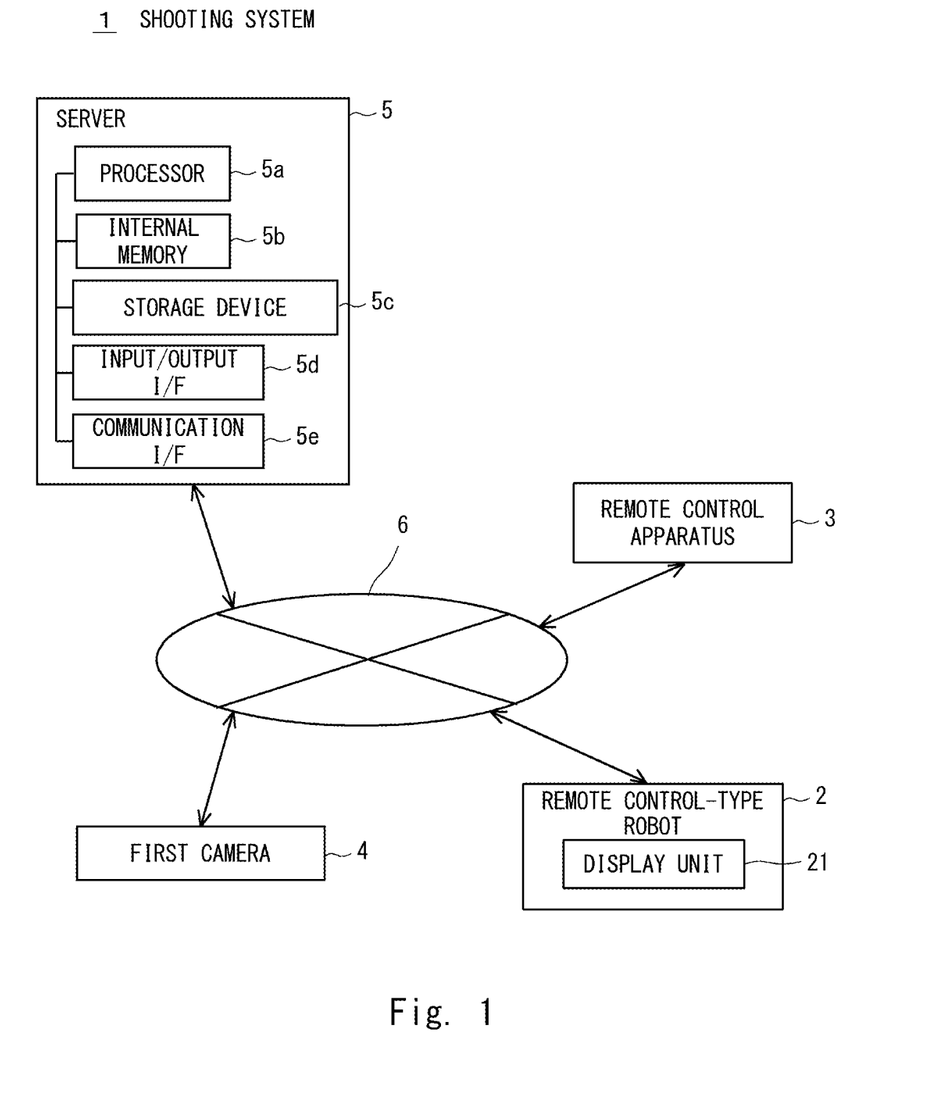
FIG. 1 is a block diagram showing a schematic system configuration of a shooting system according to an embodiment.

Hereinbelow, embodiments of the present disclosure will be described with reference to the drawings. FIG. 1 is a block diagram showing a schematic system configuration of a shooting system according to the first embodiment. A shooting system 1 according to the first embodiment includes a remote control-type robot 2, a remote control apparatus 3, a first camera 4, and a server 5.

The remote control-type robot 2, the remote control apparatus 3, the first camera 4, and the server 5 are connected with each other for communication via a communication network 6 such as LAN (Local Area Network), WAN (Wide Area Network), or the like.

The remote control-type robot 2 includes a display unit 21 for displaying an object-to-be-shot and is operated remotely. The display unit 21 is configured of a liquid crystal display, an organic EL (Electro-Luminescence) display, or the like. The display unit 21 is disposed to a head part or a body part of the remote control-type robot 2. The display unit 21 displays an object-to-be-shot such an image of a remote operator who operates the remote control-type robot 2, a character, text, a symbol, or the like.

The remote control-type robot 2 can travel, move, and perform interaction in accordance with an operation signal transmitted from the remote control apparatus 3. The remote control-type robot 2 may be configured as a humanoid robot, an articulated robot, a tele-presence robot, or the like.

The remote control apparatus 3 remotely operates the remote control-type robot 2 by transmitting an operation signal to the remote control-type robot 2 via the server 5. The remote control apparatus 3 is configured as a terminal device such as a tablet terminal including a display unit, a switch, a touch panel, a communication unit, and the like, a smartphone, or a personal computer.

The remote operator inputs instruction information for instructing the remote control-type robot 2 of the movements to be made into the remote control apparatus 3. The remote control apparatus 3 generates an operation signal in accordance with the instruction information and transmits the generated operation signal to the remote control-type robot 2 via the server 5. Note that the server 5 may generate an operation signal based on the instruction information transmitted from the remote control apparatus 3 and then transmit the generated operation signal to the remote control-type robot 2.

The remote control apparatus 3 transmits the operation signal to the server 5 by radio communication such as Bluetooth (registered trademark), Wi-Fi (registered trademark), or wireless LAN (Local Area Network). The server 5 transmits the operation signal transmitted from the remote control apparatus 3 to the remote control-type robot 2 using radio communication.

Figure 2:
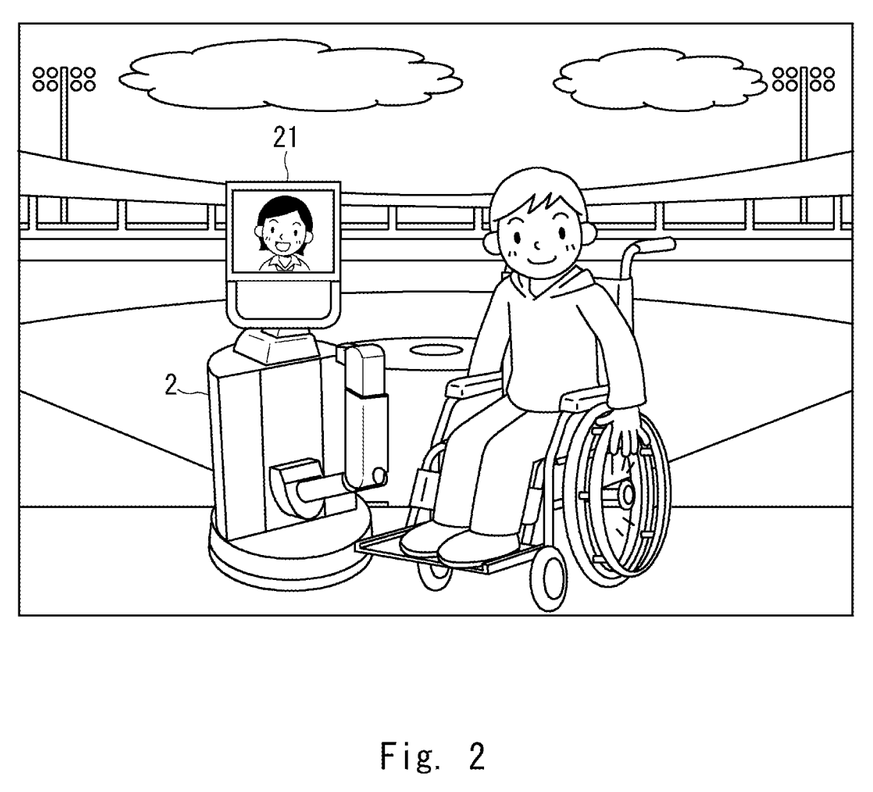
FIG. 2 is diagram illustrating shooting of a tele-presence robot and a user.

The first camera 4 is a specific example of first image capturing device. The first camera 4 shoots the remote-control type robot 2. The first camera 4 can shoot a moving image or a still image of the remote-control type robot 2. The display unit 21 of the remote control-type robot 2 falls within the shooting range of the first camera 4. For instance, as shown in FIG. 2, the first camera 4 can shoot a commemorative picture of the tele-presence robot and the user, the tele-presence robot having an image of the remote operator displayed on the display unit 21 thereof.

Examples of the first camera 4 include a camera disposed within an environment where the remote control-type robot 2 travels, a camera provided to another robot, a camera held by a user within the traveling environment of the remote control-type robot 2, and the like. The first camera 4 transmits information of the image it has shot to the server 5 using radio communication.

The server 5 has a function of performing communication with the remote control-type robot 2, the remote control apparatus 3, and the first camera 4, a function of performing image processing on an image transmitted from the first camera 4, a function of remotely controlling the remote control-type robot 2 based on the operation signal transmitted from the remote control apparatus 3, and the like.

The server 5 has a hardware configuration of a normal computer including, for instance, a processor 5a such as a CPU (Central Processing Unit) or a GPU (Graphics Processing Unit), an internal memory 5b such as a RAM (Random Access Memory) or a ROM (Read Only Memory), a storage device 5c such as a HDD (Hard Disk Drive) or a SDD (Solid State Drive), an input/output I/F 5d for establishing connections with peripheral devices such as a display, and a communication I/F 5e for performing communication with devices disposed outside the server.

The server 5 can realize each of the functions by, for instance, causing the processor 5a to implement the programs stored in the storage device 5c, the internal memory 5b, and the like by using the internal memory 5b.

Meanwhile, when the image displayed on the display unit of the remote control-type robot is, for instance, too bright or too dark, or is not clearly displayed due to backlighting, reflection of light, or the like, it may be difficult to shoot the object-to-be-shot displayed on the display unit of the remote control-type robot with the first camera.

On the other hand, when the display unit 21 of the remote control-type robot 2 falls within the shooting range of the first camera 4, the shooting system 1 according to the first embodiment replaces the image of the object-to-be-shot displayed on the display unit 21 of the remote control-type robot 2 shot by the first camera 4 with another clearer image of the object-to-be-shot so that the image of the object-to-be-shot displayed on the display unit 21 of the remote control-type robot 2 shot by the first camera 4 is made clearer. By replacing the image of the object-to-be-shot displayed on the display unit 21 of the remote control-type robot 2 shot by the first camera 4 with another clearer image of the object-to-be-shot, the shooting system 1 can favorably shoot the image of object-to-be-shot displayed on the display unit 21 of the remote control-type robot 2.

Figure 3:
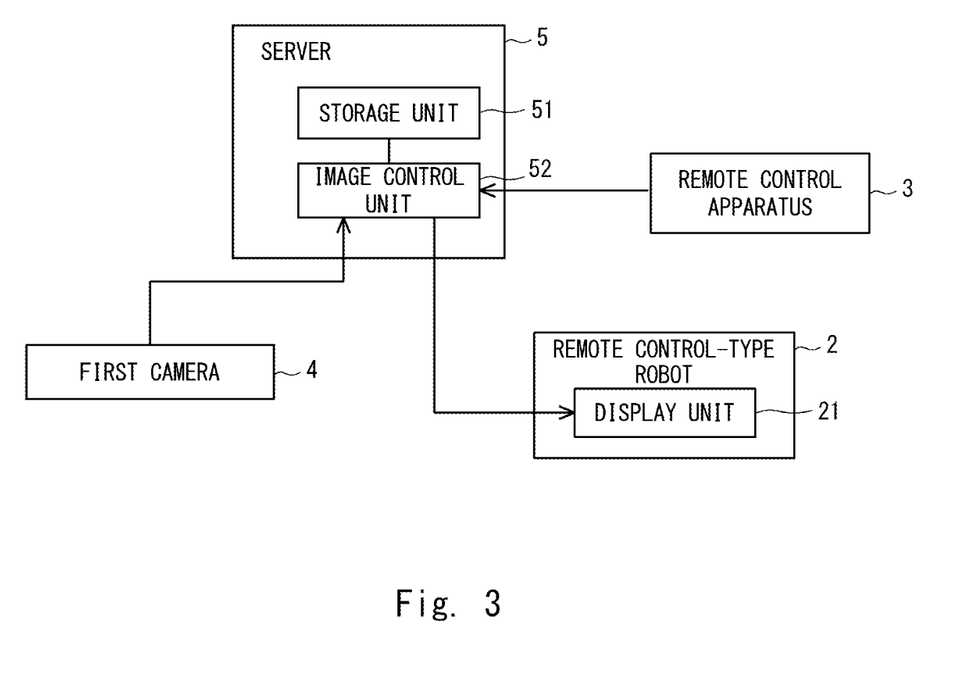
FIG. 3 is a block diagram showing a schematic system configuration of a server according to the embodiment.

FIG. 3 is a block diagram showing a schematic system configuration of a server according to the first embodiment. The server 5 according to the first embodiment includes a storage unit 51 that stores an image and an image control unit 52 that replaces an image of the object-to-be-shot displayed on the display unit 21 of the remote control-type robot 2 shot by the first camera 4 with another clearer image of the object-to-be-shot stored in the storage unit 51.

The storage unit 51 is a specific example of storage unit. The storage unit 51 is configured as, for instance, the aforementioned storage device 5c. The storage unit 51 has a clear image associated with the object-to-be-shot stored therein in advance. For instance, when the object-to-be-shot is the remote operator, the storage unit 51 has the images of the upper body and the face of the remote operator stored therein.

When the display unit 21 of the remote control-type robot 2 falls within the shooting range of the first camera 4, the image control unit 52 replaces the image of the object-to-be-shot displayed on the display unit 21 of the remote control-type robot 2 shot by the first camera 4 with another clearer image stored in the storage unit 51. The image control unit 52 is a specific example of image control device.

The first camera 4 transmits the image it has shot to the remote control apparatus 3 via the server 5. By confirming the image of the object-to-be-shot displayed on the display unit 21 of the remote control-type robot 2 that is displayed on the remote control apparatus 3, the remote operator can decide whether or not the image of the object-to-be-shot displayed on the display unit 21 of the remote control-type robot 2 is clear.

When the remote operator determines that the image displayed on the display unit 21 of the remote control-type robot 2 is not clear for reasons such as the image is too bright or too dark, reflecting light, etc., the remote operator performs an operation on the remote control apparatus 3 to replace the unclear image with a clearer image.

When the remote operator performs the aforementioned operation, the remote control apparatus 3 transmits a replacement signal for replacing the image to the server 5 in accordance with the operation. The image control unit 52 of the server 5 replaces the image of the object-to-be-shot displayed on the display unit 21 of the remote control-type robot 2 shot by the first camera 4 with another clearer image stored in the storage unit 51 in accordance with the replacement signal transmitted from the remote control apparatus 3.

The image control unit 52 replaces the image transmitted from the first camera 4 with another clearer image stored in the storage unit 51 for the part of the image which is unclear as regards the object-to-be-shot displayed on the display unit 21 of the remote control type robot 2 and performs synthesizing processing of the whole image. The image control unit 52 may transmit the clear image that has been obtained by synthesizing processing to the remote control apparatus 3, other image output apparatuses and storage apparatuses, and the like.

Figure 4:
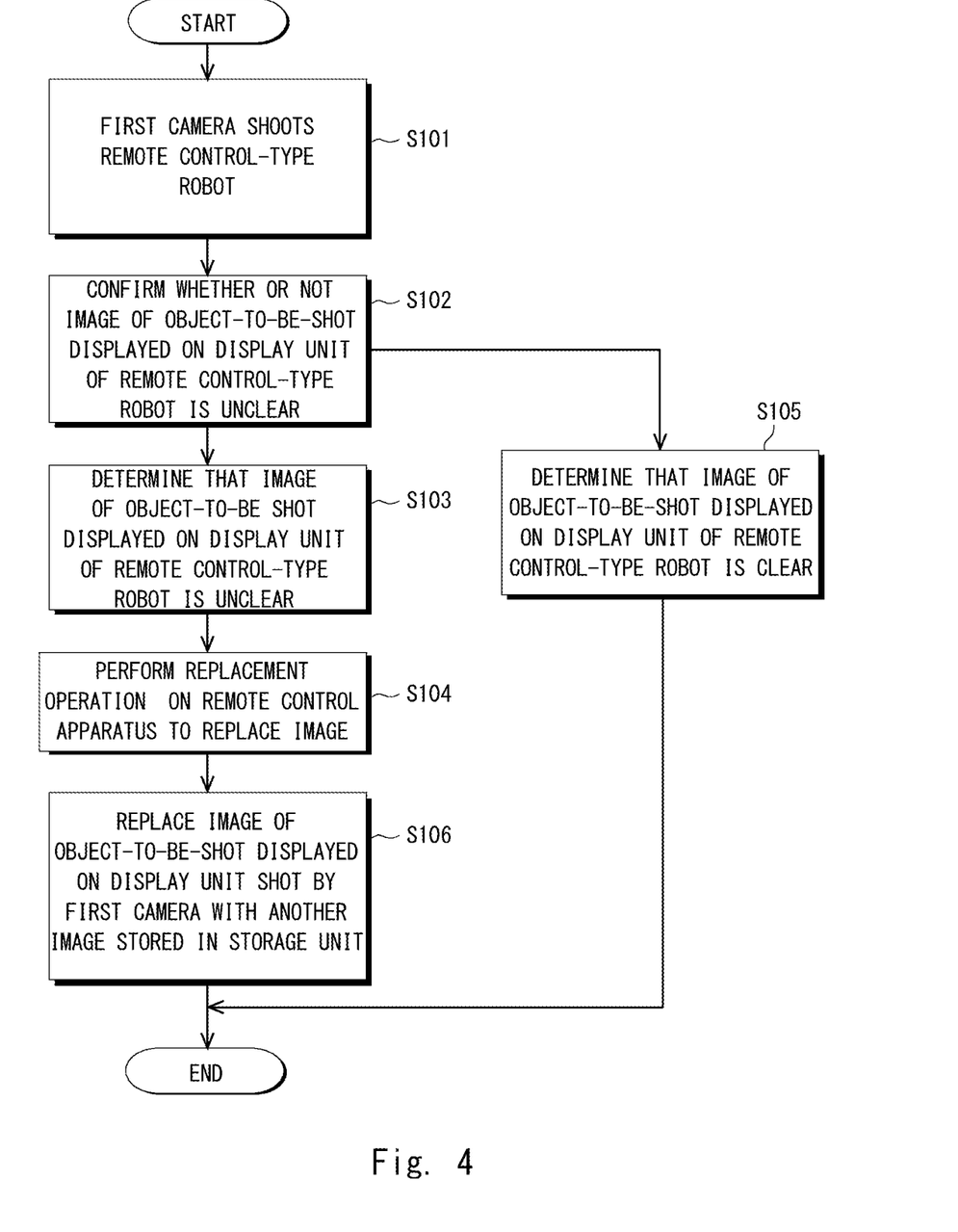
FIG. 4 is a flowchart showing a flow of processing performed in a shooting method according to the embodiment.

Next, a shooting method according to the first embodiment will be described in detail. FIG. 4 is a flowchart showing a flow of processing performed in a shooting method according to the first embodiment.

The first camera 4 shoots the remote control-type robot 2 (Step S101) and transmits the image it has shot to the remote control apparatus 3 via the server 5.

The remote operator confirms whether or not the image of the object-to-be-shot displayed on the display unit 21 of the remote control-type robot 2 transmitted from the first camera 4 is unclear by checking the image through the display unit of the remote control apparatus 3 (Step S102).

When the remote operator determines that the image of the object-to-be shot displayed on the display unit 21 of the remote control-type robot 2 is not clear (Step S103), the remote operator performs an operation on the remote control apparatus 3 to replace the unclear image with a clearer image (Step S104). In accordance with the aforementioned operation, the remote control apparatus 3 transmits the replacement signal for replacing the image to the server 5. On the other hand, when the remote operator determines that the image of the object-to-be-shot displayed on the display unit 21 of the remote control-type robot 2 is clear (Step S105), the present processing ends.

The image control unit 52 of the server 5 replaces the image of the object-to-be-shot displayed on the display unit 21 of the remote control-type robot 2 shot by the first camera 4 with another clearer image stored in the storage unit 51 in accordance with the replacement signal transmitted from the remote control apparatus 3 (Step S106).

Figure 5:
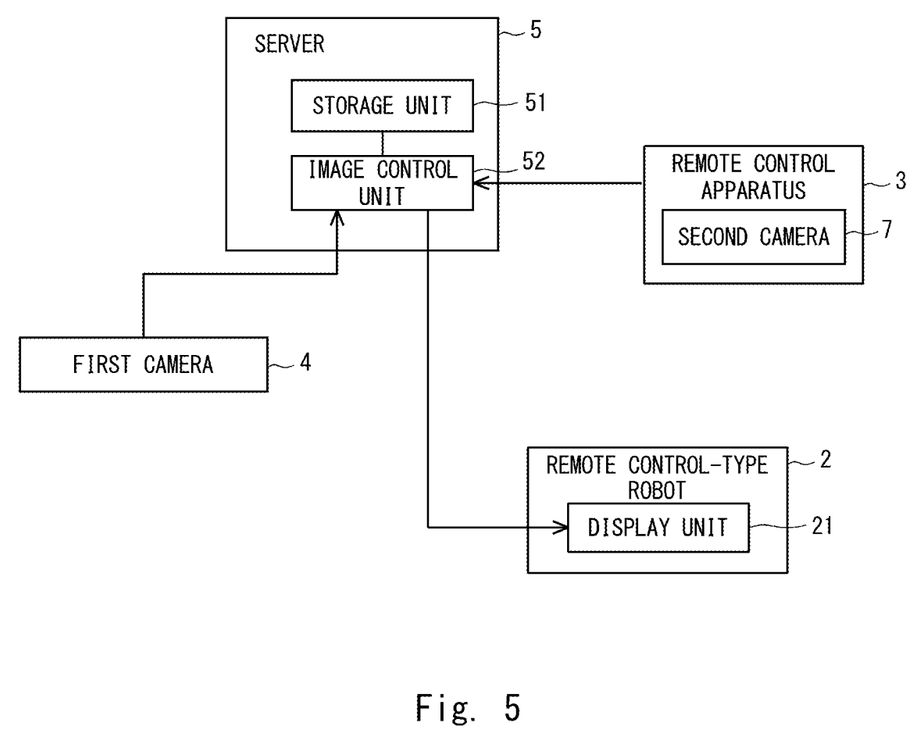
FIG. 5 is a block diagram showing a system configuration of another shooting system according to the embodiment.

The shooting system 1 according to the first embodiment may further include a second camera 7 for shooting the remote operator as shown in FIG. 5. The second camera 7 is a specific example of second image capturing device. The second camera is provided to, for instance, the remote control apparatus 3.

The image control unit 52 of the server 5 replaces the image of the object-to-be-shot displayed on the display unit 21 of the remote control-type robot 2 shot by the first camera 4 with the image of the remote operator shot by the second camera 7 in accordance with the replacement signal transmitted from the remote control apparatus 3. Accordingly, by replacing the image of the object-to-be-shot displayed on the display unit 21 of the remote control-type robot 2 shot by the first camera 4 with the clearer image shot by the second camera 7, it is possible to favorably shoot the image of the object-to-be-shot displayed on the display unit 21 of the remote control-type robot 2.

As described above, when the display unit 21 of the remote control-type robot 2 falls within the shooting range of the first camera 4, the shooting system 1 according to the first embodiment replaces the image of the object-to-be-shot displayed on the display unit 21 of the remote control-type robot 2 shot by the first camera 4 with another clearer image of the object-to-be-shot so that the image of the object-tobe-shot displayed on the display unit 21 of the remote control-type robot 2 shot by the first camera 4 is made clearer. By replacing the image of the object-to-be-shot displayed on the display unit 21 of the remote control-type robot 2 shot by the first camera 4 with another clearer image of the object-to-be-shot, the shooting system 1 can favorably shoot the image of the object-to-be-shot displayed on the display unit 21 of the remote control-type robot 2.

Second Embodiment

Figure 6:
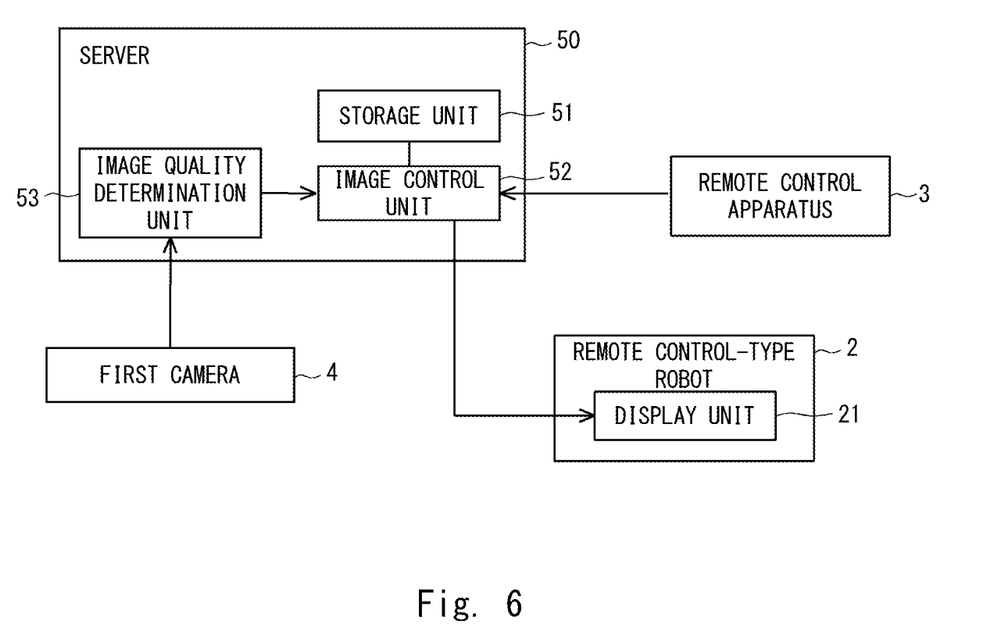
FIG. 6 is a block diagram showing a schematic system configuration of a shooting system according to an embodiment.

FIG. 6 is a block diagram showing a schematic system configuration of a shooting system according to a second embodiment. A server 50 according to the second embodiment has a configuration in which an image quality determination unit 53 that determines the image quality of the image of the object-to-be-shot based on the image of the object-to-be-shot displayed on the display unit 21 of the remote control-type robot 2 shot by the first camera 4 is further added in the server 50 according to the first embodiment.

When the image quality determination unit 53 determines that the image quality of the image of the object-to-be-shot is poor, the image control unit 52 replaces the image of the object-to-be-shot displayed on the display unit 21 of the remote control-type robot 2 shot by the first camera 4 with another clearer image of the object-to-be-shot.

The image quality determination unit 53 of the server 50 is a specific example of determination device. The first camera 4 transmits the image it has shot to the server 50. The image quality determination unit 53 of the server 50 may determine whether or not the image of the object-to-be determined displayed on the display unit 21 of the remote control-type robot 2 is clear based on the brightness, the darkness, the contrast, and the like of the image transmitted from the first camera 4.

For instance, the image quality determination unit 53 may determine whether or not the image of the object-to-be-shot displayed on the display unit 21 of the remote control-type robot 2 is clear using a learning device. The learning device learns the image of the object-to-be-shot such as a face in advance. The learning device outputs, to an input image, an output signal indicating whether or not the input image is the image of the object-to-be-shot.

By inputting the image of the object-to-be-shot transmitted from the first camera 4 to the aforementioned learned learning device and outputting the output signal indicating that the input image is the image of the object-to-be-shot, the image quality determination unit 53 may determine that the image of the object-to-be-shot displayed on the display unit 21 of the remote control-type robot 2 is clear when the image of the object-to-be-shot can be recognized correctly.

The learning device is configured of, for instance, a neural network such as RNN (Recurrent Neural Network). The RNN may include LSTM (Long Short Term Memory) in an intermediate layer thereof. The learning device may be configured of other leaning devices such as a SVM (Support Vector Machine) instead of the neural network.

Further, the image quality determination unit 53 may determine that the image of the object-to-be-shot displayed on the display unit 21 of the remote control-type robot 2 is not clear due to backlighting, reflection of light, or the like based on the standard deviation of the pixel value of the image of object-to-be-shot displayed on the display unit 21 of the remote control-type robot 2.

When the image quality determination unit 53 determines that the image of the object-to-be shot displayed on the display unit 21 of the remote control-type robot 2 is not clear, the image quality determination unit 53 transmits an unclarity signal indicating unclarity of the image to the image control unit 52. The image control unit 52 replaces the image of the object-to-be-shot displayed on the display unit 21 of the remote control-type robot 2 shot by the first camera 4 with another clearer image stored in the storage unit 51 in accordance with the unclarity signal transmitted from the image quality determination unit 53.

Note that in the second embodiment, the image quality determination unit 53 is installed in the server 50, however, it is not limited thereto. The image quality determination unit 53 may be installed in the remote control-type robot 2, the remote control apparatus 3, the first camera 4, or another server. In the second embodiment, the reference symbols identical to those of the first embodiment denote identical structural elements and the redundant explanations thereof are omitted.

Third Embodiment

In the third embodiment, when the display unit 21 of the remote control-type robot 2 falls within the shooting range of the first camera 4, the image control unit 52 adjusts the image of the object-to-be-shot displayed on the display unit 21 of the remote control-type robot 2 shot by the first camera 4 so that the image of the object-to-be-shot displayed on the display unit 21 of the remote control-type robot 2 is made clearer. As described above, by adjusting the image of the object-to-be-shot displayed on the display unit 21 of the remote control-type robot 2 shot by the first camera 4 so that the image is displayed clearly, the image control unit 52 can favorably shoot the image of the object-to-be-shot displayed on the display unit 21 of the remote control-type robot 2.

For instance, when the remote operator determines that the image of the object-to-be-shot displayed on the display unit 21 of the remote control-type robot 2 is not clear for reasons such as the image is too bright or too dark, reflecting light, etc., the remote operator performs an adjustment operation for adjusting the unclear image on the remote control apparatus 3.

When the remote operator performs the aforementioned adjustment operation, the remote control apparatus 3 transmits an adjustment signal for adjusting the image to the server 5 in accordance with the adjustment operation. The image control unit 52 of the server 5 adjusts the image of the object-to-be-shot displayed on the display unit 21 of the remote control-type robot 2 shot by the first camera 4 in accordance with the adjustment signal transmitted from the remote control apparatus 3 so that the image of the object-to-be-shot displayed on the display unit 21 of the remote control-type robot 2 is made clearer.

The image control unit 52 may automatically adjust the image of the object-to-be-shot displayed on the display unit 21 of the remote control-type robot 2 shot by the first camera 4 so that the image of the object-to-be-shot displayed on the display unit 21 of the remote control-type robot 2 shot by the first camera 4 is made clearer.

The image quality determination unit 53 may determine the image quality of the image of the image along with the state of the image such as the image being too bright or too dark, reflecting light, etc. based on the image of the object-to-be-shot displayed on the display unit 21 of the remote control-type robot 2 shot by the first camera 4.

For instance, the image quality determination unit 53 determines that the image of the object-to-be-shot displayed on the display unit 21 of the remote control-type robot 2 is too dark when the luminance of the image of the object-to-be-shot displayed on the display unit 21 of the remote control-type robot 2 is equal to or lower than the first prescribed value. In this case, the image control unit 52 re-sets the luminance of the image of the object-to-be-shot displayed on the display unit 21 of the remote control-type robot 2 to be larger than the first prescribed value in accordance with the result of the determination performed by the image quality determination unit 53, and controls the luminance of the display unit 21 so that the image displayed on the display unit 21 of the remote control-type robot 2 is made clearer.

The image quality determination unit 53 determines that the image of the object-to-be-shot displayed on the display unit 21 of the remote control-type robot 2 is too bright when the luminance of the image of the object-to-be-shot displayed on the display unit 21 of the remote control-type robot 2 is equal to or larger than the second prescribed value. In this case, the image control unit 52 re-sets the luminance of the image of the object-to-be-shot displayed on the display unit 21 of the remote control-type robot 2 to be larger than the first prescribed value in accordance with the result of the determination performed by the image quality determination unit 53, and controls the luminance of the display unit 21 so that the image of the object-to-be-shot displayed on the display unit 21 of the remote control-type robot 2 is made clearer.

The image quality determination unit 53 determines that the image of the object-to-be-shot is reflecting light or is in a backlit state based on the image of the object-to-be-shot displayed on the display unit 21 of the remote control-type robot 2 shot by the first camera 4. In this case, the image control unit 52 adjusts the color intensity of black or white in the image displayed on the display unit 21 of the remote control-type robot 2 in accordance with the result of the determination performed by the image quality determination unit 53 so that the image of the object-to-be-shot displayed on the display unit 21 of the remote control-type robot 2 is made clearer.

Based on the image of the object-to-be-shot displayed on the display unit 21 of the remote control-type robot 2 shot by the first camera 4, the image quality determination unit 53 determines whether or not the image of the object-to-be-shot displayed on the display unit 21 of the remote control-type robot 2 is unclear depending on the timing of exposure of the first camera 4. In this case, the image control unit 52 adjusts the scanning timing of the image of the object-to-be-shot displayed on the display unit 21 of the remote control-type robot 2 in accordance with the result of the determination performed by the image quality determination unit 53 so that the image of the object-to-be-shot displayed on the display unit 21 of the remote control-type robot 2 is made clearer.

Figure 7:
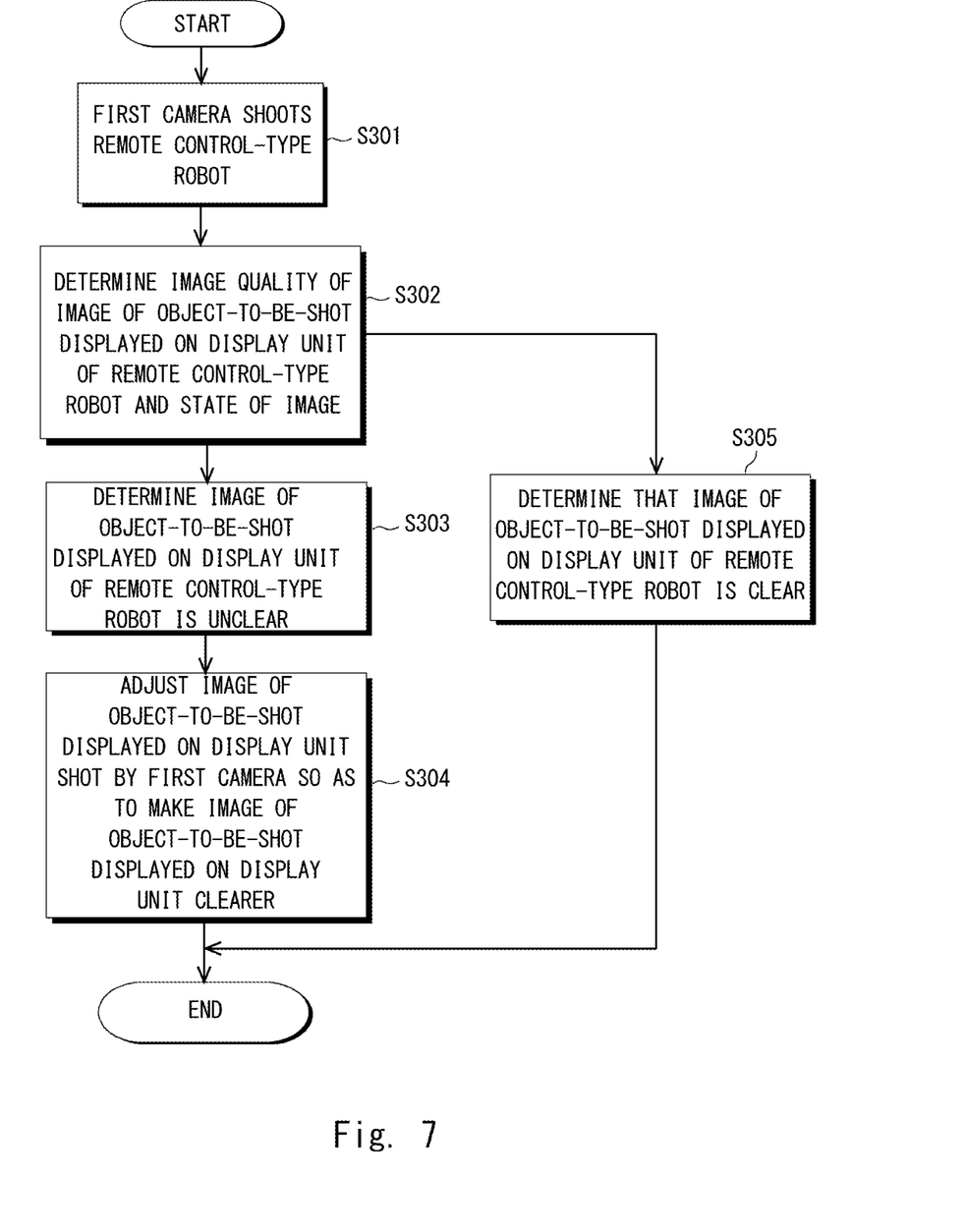
FIG. 7 is a flowchart showing a flow of processing performed in a shooting method according to an embodiment.

Next, a shooting method according to the third embodiment will be described in detail. FIG. 7 is a flowchart showing a flow of processing performed in a shooting method according to the third embodiment.

The first camera 4 shoots the remote control-type robot 2 (Step S301) and transmits the image it has shot to the server 50.

The image quality determination unit 53 of the server 50 determines the image quality of the image of the object-to-be-determined along with the state of the image such as the image being too bright or too dark, reflecting light, etc. based on the image of the object-to-be-shot displayed on the display unit 21 of the remote control-type robot 2 shot by the first camera 4 (Step S302).

The image quality determination unit 53 determines that the image of the object-to-be-shot displayed on the display unit 21 of the remote control-type robot 2 is not clear (Step S303). In this case, the image control unit 52 adjusts the image of the object-to-be-shot displayed on the display unit 21 of the remote control-type robot 2 shot by the first camera 4 in accordance with the result of the determination performed by the image quality determination unit 53 so that the image of the object-to-be-shot displayed on the display unit 21 of the remote control-type robot 2 is made clearer (Step S304). On the other hand, when the image quality determination unit 53 determines that the image of the object-to-be-shot displayed on the display unit 21 of the remote control-type robot 2 is clear (Step S305), the present processing ends. Note in the third embodiment, the reference symbols identical to those of the aforementioned embodiment denote identical structural elements and the redundant explanations thereof are omitted.

Fourth Embodiment

In the fourth embodiment, when the display unit 21 of the remote control-type robot 2 falls within the shooting range of the first camera 4, the image control unit 52 changes the position and the posture of the display unit 21 so that the image of the object-to-be-shot displayed on the display unit 21 of the remote control-type robot 2 shot by the first camera 4 is made clearer. As described above, by adjusting the position and the posture of the display unit 21 so that the image of the object-to-be-shot displayed on the display unit 21 of the remote control-type robot 2 shot by the first camera 4 is made clearer, the image control unit 52 can favorably shoot the image of the object-to-be-shot displayed on the display unit 21 of the remote control-type robot 2.

For instance, the image quality determination unit 53 determines that the image of the object-to-be-shot is reflecting light based on the image of the object-to-be-shot displayed on the display unit 21 of the remote control-type robot 2 shot by the first camera 4. In this case, the image control unit 52 adjusts the position and the posture of the display unit 21 in accordance with the result of the determination performed by the image quality determination unit 53 so that the image of the object-to-be-shot displayed on the display unit 21 of the remote control-type robot 2 shot by the first camera 4 is made clearer.

By controlling the traveling of the remote control-type robot 2, the image control unit 52 can change the position of the display unit 21. Further, the image control unit 52 controls each joint of the remote control-type robot 2, and by controlling the posture of each joint, the posture of the display unit 21 can be changed.

Note that the display unit 21 may include an actuator such as a servo motor for changing the posture of the display unit 21. The image control unit 52 can change the posture of the display unit 21 directly by controlling the actuator. Note that in the fourth embodiment, the reference symbols identical to those of the aforementioned embodiments denote identical structural elements and the redundant explanations thereof are omitted.

Several embodiments of the present disclosure have been described above but these embodiments are given as mere examples and are not intended to limit the scope of the present disclosure. These novel embodiments can be implemented in various other embodiments and various omission, replacement, and change can be made thereto without departing from the spirit of the present disclosure. These embodiments and modifications thereof are included in the scope and the gist of the present disclosure and are also included in the scope of the disclosure described in the claims and equivalent scope thereof.

Figure 8:
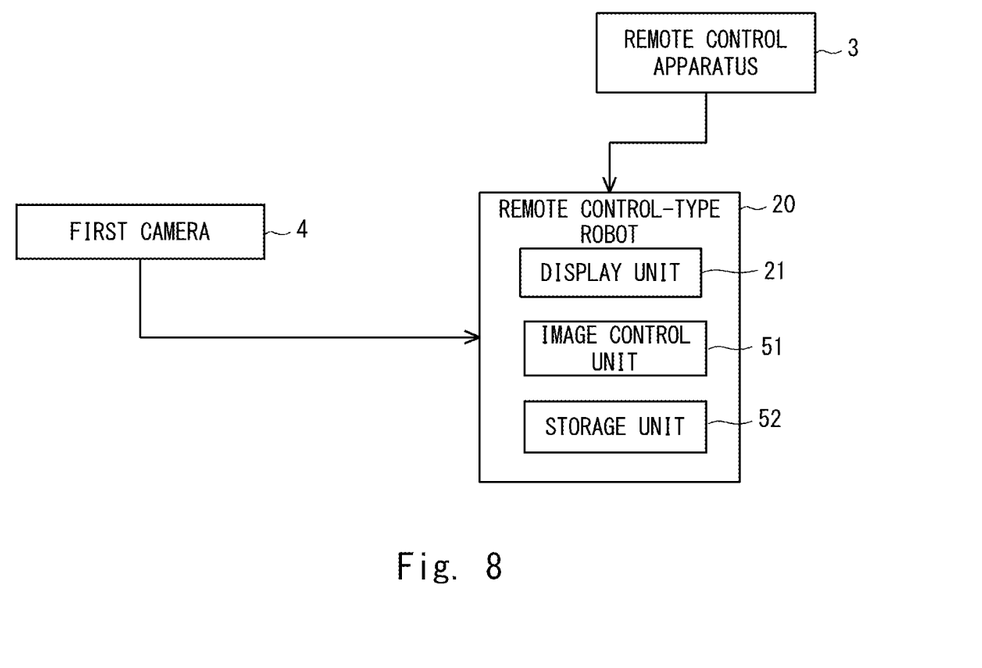
FIG. 8 is a block diagram showing another system configuration of the shooting system according to an embodiment.

In the aforementioned embodiment, the configuration of the shooting system may not include the server 5 as shown in FIG. 8. In this case, the image control unit 52 and the storage unit 51 may, for instance, be provided to the remote control-type robot 20. The remote control-type robot 20 may perform radio communication with the remote control apparatus 3 and the first camera 4 directly or may perform radio communication via a network.

The present disclosure may implement the processing show in FIGS. 4 and 7 by causing a processor execute the computer program.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The program can be stored and provided to a computer using any type of non-transitory computer readable media. Examples of transitory computer readable media include electric signals, optical signals, and electromagnetic waves. Transitory computer readable media can provide the program to a computer via a wired communication line such as electric wires and optical fibers or a wireless communication line.

Each unit configuring the shooting system according to the aforementioned embodiments cannot only be implemented by the program but can also be realized by exclusive hardware such as ASIC (Application Specific Integrated Circuit), FPGA (Field-Programmable Gate Array), or the like.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A shooting method for a shooting system that comprises:
   a remote control-type robot including a display unit for displaying an image of an object-to-be-shot and that is operated remotely; and
   first image capturing device for shooting the remote control-type robot,
   the method comprising performing at least one of:
      replacing the image of the object-to-be-shot displayed on the display unit shot by the first image capturing device;
      adjusting the image of the object-to-be-shot displayed on the display unit;
      changing a position of the display unit; and
      changing a posture of the display unit
   when the display unit of the remote control-type robot falls within a shooting range of the first image capturing device so that the image of the object-to-be-shot displayed on the display unit is made clearer.

2. The shooting method for the shooting system according to claim 1, wherein
   image quality of the image of the object-to-be-shot is determined based on the image of the object-to-be-shot displayed on the display unit shot by the first image capturing device, and
   at least one of:
      replacing the image of the object-to-be-shot displayed on the display unit shot by the first image capturing device;
      adjusting the image of the object-to-be-shot displayed on the display unit;
      changing the position of the display unit; and
      changing the posture of the display unit
   is performed when it is determined that the image quality of the image of the object-to-be-shot is poor.

3. The shooting method for the shooting system according to claim 2, wherein when it is determined that the image quality of the image of the object-to-be-shot is poor, the image of the object-to-be-shot displayed on the display unit shot by the first image capturing device is replaced by another image of the object-to-be-shot stored in a storage unit in advance.

4. The shooting method for the shooting system according to claim 2, wherein when it is determined that the image quality of the image of the object-to-be-shot is poor, the image of the object-to-be-shot displayed on the display unit shot by the first image capturing device is replaced by another image of the object-to-be-shot shot by a second image capturing device.

5. The shooting method for the shooting system according to claim 2, wherein
   the image quality of the image of the object-to-be-shot is determined along with a state of the image of the object-to-be-shot based on the image of the object-to-be-shot displayed on the display unit shot by the first image capturing device, and
   when it is determined that the image quality of the image of the object-to-be-shot is poor such that a luminance of the image of the object-to-be-shot is equal to or lower than a first prescribed value and the image is dark, a luminance of the display unit is controlled so that the luminance of the image of the object-to-be-shot is made larger than the first prescribed value, and when it is determined that the image quality of the image of the object-to-be-shot is poor such that the luminance of the image of the object-to-be-shot is higher than a second prescribed value and the image is bright, the luminance of the display unit is controlled so that the luminance of the image of the object-to-be-shot is made smaller than the second prescribed value.

6. A non-transitory computer readable medium storing a program for a shooting system that comprises:
   a remote control-type robot including a display unit for displaying an image of an object-to-be-shot and that is operated remotely; and
   first image capturing device for shooting the remote control-type robot,
   the program causing a computer to perform at least one of:

replacing the image of the object-to-be-shot displayed on the display unit shot by the first image capturing device;
adjusting the image of the object-to-be-shot displayed on the display unit;
changing a position of the display unit; and
changing a posture of the display unit
when the display unit of the remote control-type robot falls within a shooting range of the first image capturing device so that the image of the object-to-be-shot displayed on the display unit is made clearer.

7. A shooting system comprising:
a remote control-type robot including a display unit for displaying an image of an object-to-be-shot and that is operated remotely;
first image capturing device for shooting the remote control-type robot; and
image control device for performing at least one of:
  replacing the image of the object-to-be-shot displayed on the display unit shot by the first image capturing device;
  adjusting the image of the object-to-be-shot displayed on the display unit;
  changing a position of the display unit; and
  changing a posture of the display unit
when the display unit of the remote control-type robot falls within a shooting range of the first image capturing device so that the image of the object-to-be-shot displayed on the display unit is made clearer.

8. A shooting system comprising:
a remote control-type robot including a display for displaying an image of an object-to-be-shot and that is operated remotely;
a camera configured to shoot the remote control-type robot; and
an image controller configured to perform at least one of:
  replacing the image of the object-to-be-shot displayed on the display shot by the camera;
  adjusting the image of the object-to-be-shot displayed on the display;
  changing a position of the display; and
  changing a posture of the display
when the display unit of the remote control-type robot falls within a shooting range of the camera so that the image of the object-to-be-shot displayed on the display is made clearer.

* * * * *